United States Patent [19]

Iwanaga

[11] Patent Number: 4,769,782

[45] Date of Patent: Sep. 6, 1988

[54] AUTOMATIC SYSTEM FOR PRIORITIZED SELECTION OF A MAGNETIC TAPE DEVICE FROM A GROUP OF TAPE DEVICES BASED ON THE NOT-BUSY STATUS AND THE DYNAMIC STATUS OF THE DRIVE MECHANISM

[75] Inventor: Masaharu Iwanaga, Kamakura, Japan

[73] Assignee: Hitachi, Ltd., Tokyo, Japan

[21] Appl. No.: 515,511

[22] Filed: Jul. 20, 1983

[30] Foreign Application Priority Data

Jul. 22, 1982 [JP] Japan .................................. 57-128020

[51] Int. Cl.$^4$ .............................................. G06F 12/00
[52] U.S. Cl. .................................................. 364/900
[58] Field of Search ... 364/200 MS File, 900 MS File, 364/550; 369/30, 29; 360/91, 137, 69, 71, 74.1

[56] References Cited

U.S. PATENT DOCUMENTS 4,310,883  1/1982  Clifton et al. ................. 364/200
4,410,942 10/1983  Milligan ....................... 364/200
4,413,328 11/1983  Videki .......................... 360/91 X
4,428,064  1/1984  Hempy .......................... 364/900

OTHER PUBLICATIONS

"IBM Reference Manual, 7070 Data Processing System" Aug. 1960, pp. 94, 95, 286.

Primary Examiner—Raulfe B. Zache
Assistant Examiner—Florin Munteanu
Attorney, Agent, or Firm—Antonelli, Terry & Wands

[57] ABSTRACT

A data processing system in which, when a magnetic tape device is required for execution of a job, a group of magnetic tape devices is designated and an appropriate one of the magnetic tape devices in the designated group is selected and allocated to the job. In order to start the execution of the job as early as possible, status data indicating whether a magnetic tape is loaded in a device and is being rewound or not is read, and one of the magnetic tape devices in the designated group, which is not loaded with a magnetic tape, is selected to have a top priority. In the absence of such a device, a magnetic tape device loaded with a magnetic tape which is not being rewound is selected in preference to the others.

5 Claims, 4 Drawing Sheets

FIG. 4

| 109 | 110 | 111 | 112 | 113 | 114 |
|---|---|---|---|---|---|
| TAPE 0 | $T_{00}$ | ADDRESS | 1 | STATUS DATA 00 |
| | $T_{01}$ | ADDRESS | 0 | STATUS DATA 01 |
| | $T_{02}$ | ADDRESS | 0 | STATUS DATA 02 |
| | $T_{03}$ | ADDRESS | 1 | STATUS DATA 03 |
| TAPE 1 | $T_{10}$ | ADDRESS | 0 | STATUS DATA 10 |
| | $T_{11}$ | ADDRESS | 0 | STATUS DATA 11 |
| | $T_{12}$ | ADDRESS | 0 | STATUS DATA 12 |
| | $T_{13}$ | ADDRESS | 1 | STATUS DATA 13 |
| TAPE N | $T_{N0}$ | ADDRESS | 0 | |
| | $T_{N1}$ | ADDRESS | 0 | |
| | $T_{N2}$ | ADDRESS | 0 | |
| | $T_{N3}$ | ADDRESS | 0 | |

FIG. 6

| | 120 |
|---|---|
| $T_{00}$ | POINTER TO $T_{00}$ OF THE TABLE 109 |
| $T_{03}$ | POINTER TO $T_{03}$ OF THE TABLE 109 |

AUTOMATIC SYSTEM FOR PRIORITIZED SELECTION OF A MAGNETIC TAPE DEVICE FROM A GROUP OF TAPE DEVICES BASED ON THE NOT-BUSY STATUS AND THE DYNAMIC STATUS OF THE DRIVE MECHANISM

BACKGROUND OF THE INVENTION

1. Field of the Invention

The present invention relates to a method of allocating a particular magnetic tape device for a user program from among a plurality of magnetic tape devices provided in a data processing system.

2. Description of the Prior Art

The unit of work performed in a data processing system (including the execution of one or more user programs) is called a "job". The system resource such as I/O is exclusively occupied by this job unit. In the case where the use of a magnetic tape device is required, the operator enters the job by designating a magnetic tape device prior to the execution of the job. There are a few methods of designation of a magnetic tape device. In one method, a particular device is designated. The inconvenience of this method is that if the device designated is occupied (used) exclusively by another job, the allocation thereof is impossible until the occupation is cancelled and therefore the desired job cannot be executed until the cancellation of the occupying job. Another method consists in dividing magnetic tape devices into a plurality of groups, in which the operator designates one group and a device included in the group is selected by control of the data processing system.

In conventional methods of selective allocation of a device from a given device group, an unoccupied device is searched for in an ascendant or descendant order of addresses of the devices making up the group, so that a device first found unoccupied is selected and allocated. Nevertheless, the unoccupied device may be in one of several statuses. For example, the magnetic tape for another job may or may not be left loaded in the device. The execution of the next job can of course be started earlier when the magnetic tape is not loaded. Conventionally, a device is allocated regardless of the dynamic status of the device, thus making an optimum allocation impossible.

SUMMARY OF THE INVENTION

An object of the present invention is to provide a method of allocating a magnetic tape device reflecting the conditions of the magnetic tape device.

Another object of the present invention is to provide a method of allocation of a magnetic tape device which permits the execution of a job to be started early.

According to the present invention, there is provided a method of magnetic tape device allocation, wherein whenever the allocation of a magnetic tape device is demanded, the status information of the magnetic tape devices included in an intended group is read and the data thus obtained on the status is used to allocate a magnetic tape device being unloaded magnetic tape in preference to the other devices in the same group.

BRIEF DESCRIPTION OF DRAWINGS

FIG. 4 shows an example of a control table provided in a main memory.

FIG. 6 is a diagram showing a device allocation table provided on a main memory for each job.

DESCRIPTION OF THE PREFERRED EMBODIMENT

Figure 1:
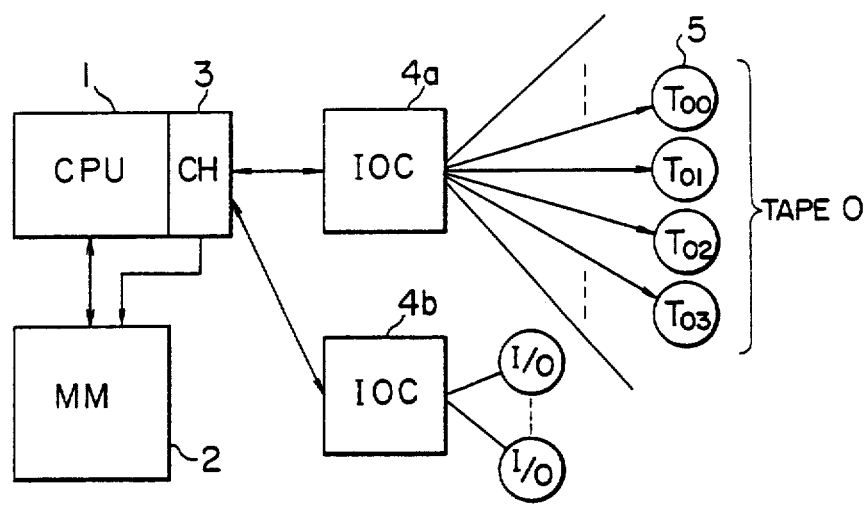
FIG. 1 is a diagram schematically illustrating the construction of a data processing system.

A configuration of a data processing system to which the present invention is applicable is shown schematically in FIG. 1.

Figure 2:
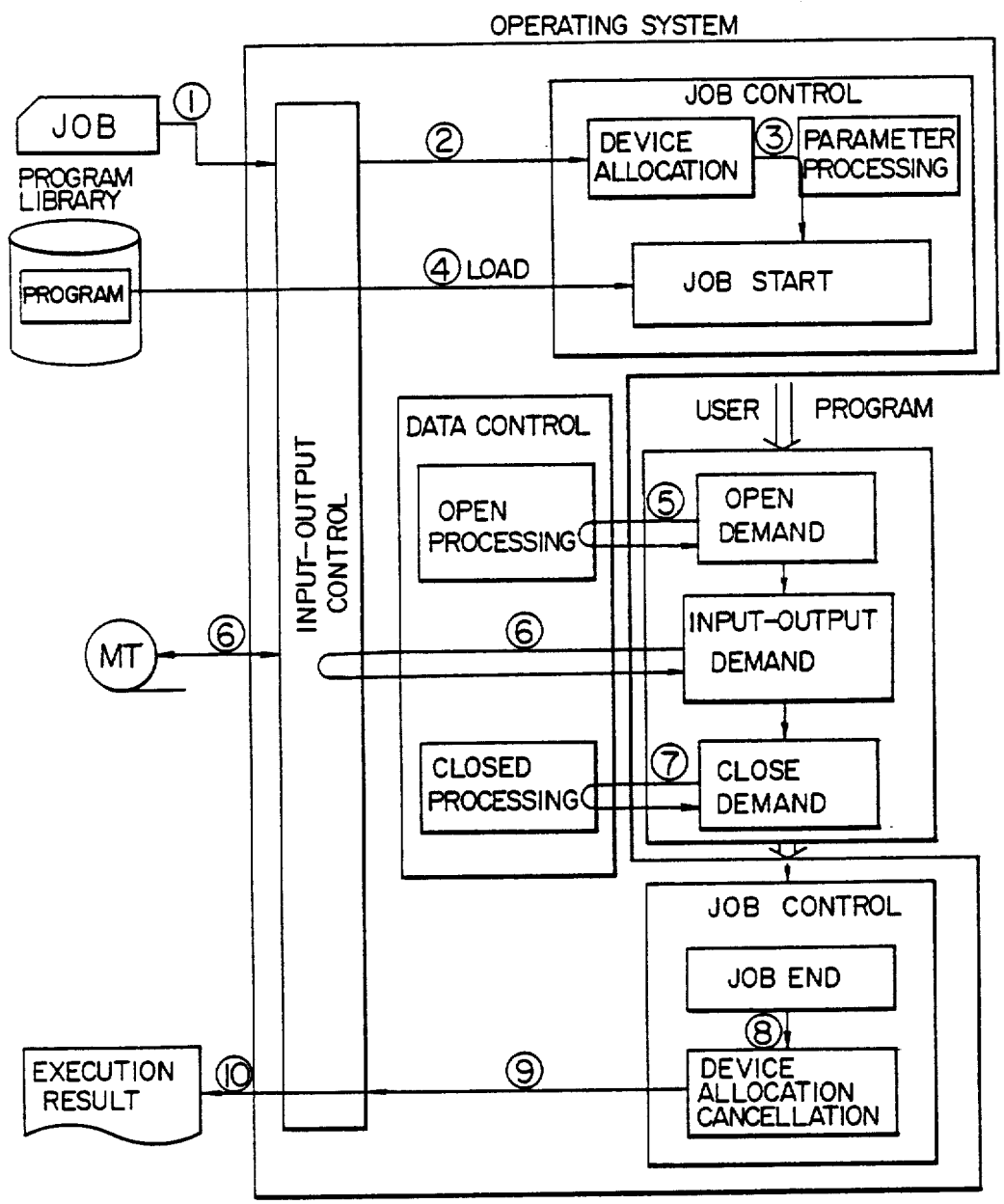
FIG. 2 is a diagram schematically illustrating a configuration of an operating system.

A central processing unit (CPU) 1 performs a processing operation according to a program contained in a main memory 2 and reads or writes data from or into the main memory 2 as required during the processing operation. The central processing unit 1, on the other hand, is connected through an input-output channel 3 normally to a plurality of input-output control units 4a, 4b. Reference numeral 4a designates a magnetic tape control unit which is connected to a plurality of magnetic tape devices 5 and controls them. These magnetic tape devices are divided into a plurality of groups by user, of which only the group Tape 0 is shown and is assumed to include four devices $T_{00}$ to $T_{03}$. The input-output control unit 4b takes the form of, say, a magnetic disc control unit to which a plurality of input-output devices comprised of magnetic disc devices are connected. As in an ordinary data processing system, a card reader or a printer may be connected as an input-output device. A data processing system such as described above is provided with a software system called the operating system engaged in controlling the job execution. This is stored in the main memory 2 for execution by the CPU 1 whereby the data processing system is controlled, thus making up a part of the same system. This configuration is schematically shown in FIG. 2. As shown, the operating system includes a section engaged in input/output processing, a section engaged in job control, a section engaged in the control of the user program and a section engaged in data control. The configuration explained above is a very typical one.

Now, an embodiment of the present invention applied to the data processing system having a configuration as described above will be explained. First, the processes from job input to output extensively used will be described with reference to FIG. 2. ① The operator designates a group of magnetic tape devices as Tape 0, for instance, and enters the job in it. ② The input/output control performs the process of reading the job from the card reader and transfers the process to the job control. ③ The device allocation section of the job control allocates a device according to the present invention and transfers the process to The job starting section. ④ The job starting section reads the user program out of the program library in the magnetic disc device and loads the program in the main memory. ⑤ In execution of the user program, an open demand is generated. Then, the open processing section prepares an input/output control table indicating the device number allocated by the operation of the device allocation section, and informs the user program of the address of the table. ⑥ In response to the input/output demand generated to the magnetic tape device during the execution of the user program, the particular demand, together with the table address, is applied to the input/output control section. The input/output control section is informed of the magnetic tape device allocated to the program from the address, and controls the input/output for the device. ⑦ In response to a close demand of the user program, the closed processing section erases the above-mentioned input/output control table. ⑧ Upon completion of the execution of the user program, the job end section of the job control performs the end process. ⑨ The device allocation cancelling section cancels the allocation. ⑩ The input/output control section produces the result of execution.

The foregoing is a flow of a typical job process.

Now, the processes for device allocation will be explained in detail.

Figure 3:
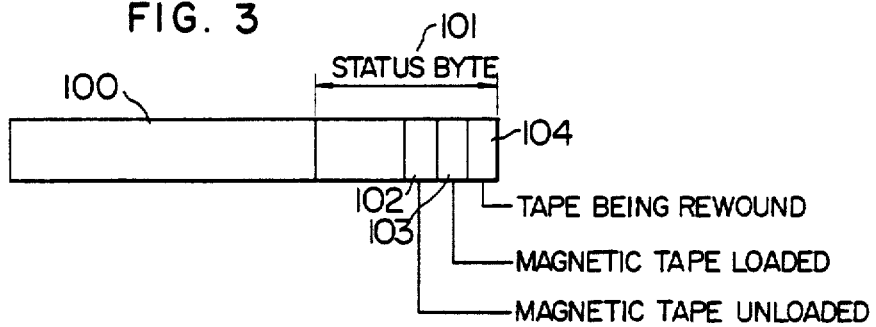
FIG. 3 is a diagram showing a configuration of a register provided in a magnetic tape device.

Each of the magnetic tape devices holds data indicating the prevailing status thereof on the register included therein. FIG. 3 shows a register 100 provided in the magnetic tape device. This includes a status byte 101 representing the status of the magnetic tape device. The status byte, in turn, includes a bit 102 set to "1" in the absence of a magnetic tape loaded on the device, a bit 103 set to "1" in the presence of a magnetic tape not being rewound, and a bit 104 set to "1" in the presence of a magnetic tape being rewound.

The main memory 2, on the other hand, contains, as shown for example in FIG. 4, a control table 109 stored therein beforehand, including a section 110 for storing the names of the groups, a section 111 for storing the names of the devices included in each group, a section 112 for storing the device addresses, a section 113 indicating whether a device is allocated or not, and a section 114 for storing the status data 102, 103, 104 of the magnetic tape devices.

Figure 5:
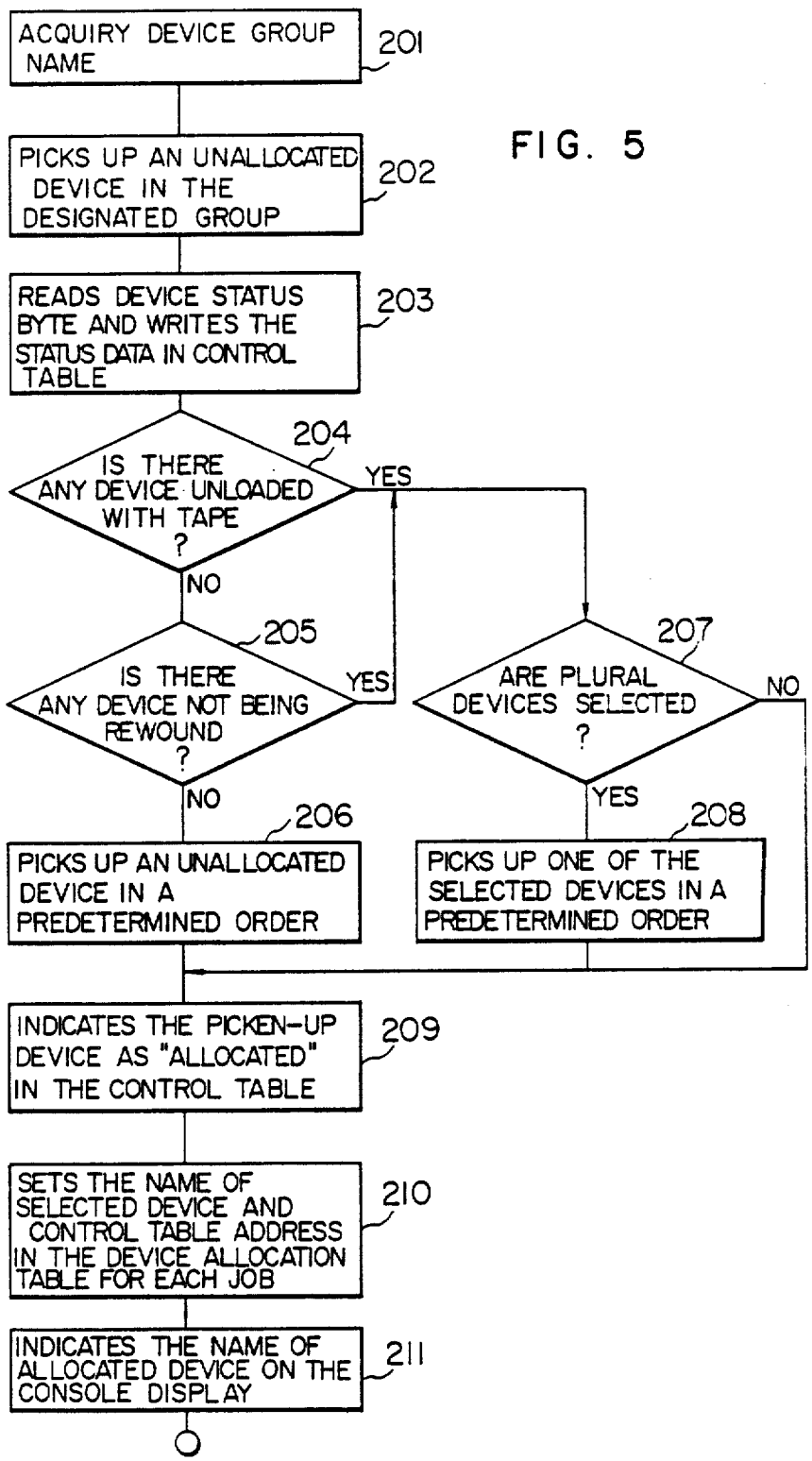
FIG. 5 is a diagram showing the details of the processes for allocating a device according to an embodiment of the present invention.

FIG. 5 shows a flowchart of the program indicating the details of the device allocation section in FIG. 2. First, step 201 obtains the name of the device group entered by the operator. Step 202 checks whether or not each device of a designated group is allocated with reference to the control table 109. If the device is already allocated for another job, "1" is stored in the section 113 indicating whether the particular device is allocated or not; or if the device is not yet allocated, "0" is stored therein, so that by reading this data, a device not yet allocated is selected. Then, the status byte 101 explained with reference to FIG. 3 for the unallocated device is read. This data is provisionally stored in the area of the main memory, from which the status data 102, 103, 104 is picked up and written in the area 114 of the control table 109.

By referring to the status data 102, a decision is made as to whether or not there is any device unloaded with magnetic tape at step 204. If the answer is "No", the next step 205 decides whether or not there is any device with the magnetic tape not being rewound with reference to the status data 103. If there is not any such device, a device is selected in a predetermined order such as in the ascending order of device numbers from among the unallocated devices as in the conventional manner at the next step 206. If the answer is "Yes" at step 204 or 205, by contrast, step 207 decides whether or not a plurality of devices are selected. When only one device is designated, the particular device is selected. If a plurality of devices are designated, on the other hand, only one of them is selected in a predetermined order at step 208. The device thus selected at step 209 is indicated as "allocated" in the corresponding region 113 of the control table 109. A device allocation table 120 is prepared for each job, as shown in FIG. 6. This table contains a pair of data including the name of the device allocated with the job and at least a pointer for reference to the address 112 of the control table. Such a pointer may alternatively be one by which the whole of the status data 114 can be referred to from the device name 111 of a given device in the control table 109. (Step 210)

Then step 211 indicates the name of the device allocated on the console display usually provided in the data processing system and gives an order to the operator to load the magnetic tape on the device allocated.

The device allocation according to an embodiment of the present invention is explained above.

In response to the above-mentioned order, the operator sets the magnetic tape on the device and after the setting of the magnetic tape, the job starting process is performed.

In this method of allocation, the device not loaded with the magnetic tape is selected in top priority, with the result that the operator, who is able to set his magnetic tape immediately, can start the job at the earliest opportunity.

As the second choice, a device with the magnetic tape already rewound is selected. In this case, it is necessary to unload and replace the magnetic tape with his tape, and therefore it takes more time for the operator to start the job.

The third choice is to select a device with the magnetic tape being rewound. It takes more time than the above-mentioned two cases before starting the job since the operator naturally has to wait for the completion of rewinding.

The above-mentioned device allocation table 120 is referred to in the open processing section explained with reference to FIG. 2, and further the input/output control table is prepared. This table shows the correspondence of each input/output process with device name 111, address 112, allocation indicating bit 113 and status data 114. In other words, an address by which device name 111, address 112, allocation indicating bit 113 and status data 114 are referred is prepared for each input/output process in the input/output control table. Whenever an input/output demand occurs subsequently, therefore, the address of the device allocated is identified by this input/output control table and the input/output operation for the particular device is performed by the input/output control section.

The closed processing is to cancel the input/output control table, and in the cancellation of device allocation, the device allocation table is erased so that the region 113 concerning the presence or absence of allocation is restored to "0".

I claim:

1. In a data processing system having a plurality of groups of magnetic tape devices and an operating system for performing control and job processing operations, a method of selecting automatically under control of said operating system a magnetic tape device in which a data input/output operation is to be performed for execution of a job, comprising the steps of:

(a) designating in said operating system one of said groups for performing said input/output operation;

(b) selecting in said operating system a device, which is not occupied by another job and is not loaded with any magnetic tape therein, from those devices belonging to the designated group;

(c) selecting in said operating system a device out of devices belonging to the designated group, which are not occupied by another job and are loaded with a magnetic tape not being rewound, in response to non-selection of any device specified in step (b); and (d) selecting in said operating system a device out of devices belonging to said designated group, which are not occupied by another job, in response to non-selection of any device in step (c).

2. A method according to claim 1, wherein said step (b) includes substeps of:

(e) detecting devices not occupied by another job from the designated group, (f) detecting the status of the devices detected in step (e); and (g) selecting a device, which is not loaded with a magnetic tape, in response to the status of the devices detected in step (f).

3. A method according to claim 1, further comprising a step (h) of storing in the data processing system a table indicating an exclusive correspondence between a device selected in steps (b), (c) or (d) and said job, and referring to said table for identifying the selected device for performing the input/output operation in the execution of said job.

4. A method according to claim 2, wherein each of said magnetic tape devices includes a register for storing data indicating whether a magnetic tape is loaded, data indicating whether a magnetic tape is loaded and is not being rewound, and data indicating whether a magnetic tape is loaded and is being rewound, said step (f) detecting the status of the device according to the data stored in said register.

5. A data processing system for performing jobs which require the use of a magnetic tape device, comprising:

a plurality of groups of magnetic tape devices, each magnetic tape device being capable of having at least a not-loaded status, a loaded-but-rewound status and a loaded-end-rewinding status when the magnetic tape device is not occupied with a job;

memory means for storing programs for performing a job and the status of each of the magnetic tape devices of said plurality of groups of magnetic tape devices;

processor means connected to said memory means for performing a job on the basis of the programs stored in said memory means and for allocating a magnetic tape device to said job from a designated group of magnetic tape devices on the basis of the status of the magnetic tape devices stored in said memory means by (1) selecting from said designated group a magnetic tape device which has a not-loaded status, (2) selecting from said designated group a magnetic tape device which has a loaded-but-rewound status when the designated group does not contain a magnetic tape device having a not-loaded status, and (3) selecting from said designated group a magnetic tape device which has a loaded-and-rewinding status when the designated group does not contain a magnetic tape device having a not-loaded status or a loaded-but-rewound status; and controller means connected to said processor means and said magnetic tape devices for connecting said processor means to an allocated magnetic tape device in the designated group of magnetic tape devices.

* * * * *